(12) United States Patent
Takahashi et al.

(10) Patent No.: US 7,524,521 B2
(45) Date of Patent: Apr. 28, 2009

(54) METHOD OF PRESERVING FOOD IN A SUPERCOOLED STATE

(75) Inventors: Kiyotaka Takahashi, Ebina (JP); Kiyotaka Miyauchi, Ebina (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 731 days.

(21) Appl. No.: 10/492,306

(22) PCT Filed: Nov. 26, 2002

(86) PCT No.: PCT/JP02/12322

§ 371 (c)(1),
(2), (4) Date: Apr. 12, 2004

(87) PCT Pub. No.: WO03/049557

PCT Pub. Date: Jun. 19, 2003

(65) Prior Publication Data

US 2005/0003057 A1    Jan. 6, 2005

(30) Foreign Application Priority Data

Dec. 13, 2001    (JP) ............... 2001-380369

(51) Int. Cl.
*A23L 3/36* (2006.01)
*B65B 55/00* (2006.01)

(52) U.S. Cl. ................. 426/393; 426/524; 62/60
(58) Field of Classification Search ............ 426/393, 426/524; 62/60
See application file for complete search history.

(56) References Cited

U.S. PATENT DOCUMENTS

| | | | | |
|---|---|---|---|---|
| 4,345,443 A | * | 8/1982 | Yamashita | ........... 62/380 |
| 4,832,972 A | * | 5/1989 | Toledo-Flores et al. | ..... 426/327 |
| 5,296,251 A | | 3/1994 | Ishida et al. | |
| 5,979,165 A | * | 11/1999 | Cox et al. | .......... 62/62 |
| 6,096,361 A | | 8/2000 | Yamane et al. | |
| 6,305,178 B1 | * | 10/2001 | Shi et al. | ............ 62/123 |
| 7,059,140 B2 | * | 6/2006 | Zevlakis | .............. 62/66 |

FOREIGN PATENT DOCUMENTS

| | | | |
|---|---|---|---|
| DE | 696 11 289 | | 8/2001 |
| EP | 0 815 746 | | 1/1998 |
| JP | 58-40043 | * | 3/1983 |
| JP | 58-158165 | * | 9/1983 |
| JP | 62091170 | | 4/1987 |
| JP | 62201565 | | 9/1987 |
| JP | 63-91170 | | 4/1988 |
| JP | 63-254945 | | 10/1988 |
| JP | 3-47034 | | 2/1991 |
| JP | 4-299965 | * | 10/1992 |
| JP | 5-161449 | | 6/1993 |
| JP | 06303954 | | 11/1994 |
| JP | 8-252082 | | 10/1996 |
| JP | 09252739 | | 9/1997 |
| JP | 10-171353 | * | 6/1998 |
| JP | 2001086967 | | 4/2001 |
| KR | 1998-702965 | | 9/1998 |
| WO | 96/28047 | | 9/1996 |

* cited by examiner

*Primary Examiner*—Steven L. Weinstein
(74) *Attorney, Agent, or Firm*—Nixon & Vanderhye P.C.

(57) ABSTRACT

A method of preserving food in a supercooled state, wherein food is packed inside a container with no head space, and then converted to a supercooled state by a cooling step in which the food is cooled from a temperature higher than the freezing point to a temperature below the freezing point at a cooling rate exceeding −0.5° C./h but no more than −5.0° C./h.

4 Claims, No Drawings

METHOD OF PRESERVING FOOD IN A SUPERCOOLED STATE

This application is the US national phase of international application PCT/JP02/12322 filed in Japanese on 26 Nov. 2002, which designated the US. PCT/JP02/12322 claims priority to JP Application No. 2001-380369 filed 13 Dec. 2001. The entire contents of these applications are incorporated herein by reference.

TECHNICAL FIELD

The present invention relates to a method of preserving food in a supercooled state, a method of preserving food in a frozen state, and a method of producing unfrozen water as a supercooled state of water.

BACKGROUND ART

Low temperature preservation is a widely used method for preserving food, and is also known to be an effective method. The technology of low temperature preservation can be broadly classified into refrigeration and freezing, and it is also widely known that from a microbiological viewpoint, lower storage temperatures are the most beneficial.

However, a problem associated with preservation methods that utilize freezing is the prevalence of deterioration in the quality of the product, known as damage by freezing, which includes the generation of drips, protein denaturation, and damage to meat as a result of damage to, or changes in, the cellular structure, all of which can be caused by freezing.

However, it is known that if a food is cooled under specific cooling conditions, then it can be converted to an unfrozen state even at a temperature below the freezing point of the food, namely, a so-called supercooled state, and when foods are preserved in this type of supercooled state, damage by freezing such as protein denaturation and cellular structure damage can be avoided.

One method of preserving food in a supercooled state is disclosed in Japanese Unexamined Patent Application, First Publication No. Hei 5-161449, wherein fruit and vegetables are sealed in a plastic bag with a thickness of 20 to 100 μm, cooled to a temperature that is 1 to 2° C. higher than the freezing point of the fruit and vegetables over a period of 1 minute to 12 hours, subsequently cooled to a temperature just higher than the disturbing temperature of supercooling at an extremely slow cooling rate of −0.5° C./hour to −0.5° C./24 hours, and then either stored or transported in that state.

Furthermore, Japanese Unexamined Patent Application, First Publication No. Hei 8-252082 discloses a method for producing a supercooled state by rapidly cooling food from room temperature to a temperature near the freezing point, and subsequently cooling the food further, to a temperature below the freezing point, at a slow cooling rate of 0.01° C./hour to 0.5° C./hour.

However, these methods require a slow cooling step in order to achieve a supercooled state, meaning not only is considerable time required for the cooling step, resulting in a low processing throughput, but adequately suppressing bacteria reproduction during the cooling step can also be difficult.

Furthermore, a supercooled state is a state in which phase transitions of liquids or gases do not occur even if cooling occurs below the phase transition temperature, and is consequently an extremely unstable state. As a result, the supercooled state can be disturbed very easily by the incorporation of impurities, vibrations, or temperature fluctuations, causing the food to freeze, and accordingly supercooling has been viewed as impractical as a method of preserving food.

In addition, converting water that contains impurities, such as tap water, into a stable unfrozen state is difficult, and in the aforementioned Japanese Unexamined Patent Application, First Publication No. Hei 8-252082, the method of producing unfrozen water required a step for removing impurities from the untreated water by filtering the water through a microfilter and/or performing a distillation.

However, providing this type of step for removing impurities from the untreated water increases the complexity of the production process, which causes a deterioration in productivity and an increase in production costs.

The present invention takes the above circumstances into consideration, with an object of providing a method of preserving food which enables the food to be converted to a supercooled state within a short timeframe, and also enables the supercooled state to be maintained with good stability.

Furthermore, the present invention also provides a method of preserving food which enables food to be preserved in frozen state with little deterioration in quality.

Furthermore, the present invention also provides a method of producing unfrozen water, which enables the unfrozen water to be produced by a simple process, at low cost.

DISCLOSURE OF INVENTION

As a result of intensive research relating to the cooling conditions required to convert food to a supercooled state, the inventors of the present invention discovered that by packing a food inside a container so that no head space exists, a supercooled state could be obtained without freezing the food, even if a faster cooling rate was employed than the slow cooling rates conventionally required to achieve such a supercooled state, and also discovered that a food which had been packed inside a container with no head space and then converted to a supercooled state at a faster cooling rate than conventional cooling rates displayed excellent stability of that supercooled state.

In other words, a method of preserving food according to the present invention is a method of preserving food in a supercooled state, wherein food is packed inside a container with no head space, and converted to a supercooled state by a cooling step in which the food is cooled from a temperature higher than the freezing point to a temperature below the freezing point at a cooling rate exceeding −0.5° C./h but no more than −5.0° C./h.

Furthermore, as a result of additional research, the inventors of the present invention discovered that by forcibly applying a stimulus to a supercooled food generated by the method of the present invention and disturbing the supercooled state, the food freezes rapidly, and moreover the frozen state achieved in this manner displays less damage to cellular structure, and results in far less quality deterioration than a conventional rapid freezing method that passes through a supercooled state.

In other words, another method of preserving food according to the present invention is a method of preserving food in a frozen state, wherein food is packed inside a container with no head space, subsequently converted to a supercooled state by a cooling step in which the food is cooled from a temperature higher than the freezing point to a temperature below the freezing point at a cooling rate exceeding −0.5° C./h but no more than −5.0° C./h, and then converted to a frozen state by disturbing the supercooled state.

In addition, according to a method of the present invention, water can be easily converted to a stable supercooled state, namely unfrozen water.

In a method of producing unfrozen water according to the present invention, water is used to fill a container with no head space, and is then converted to unfrozen water by a cooling step in which the water is cooled from a temperature higher than the freezing point to a temperature below the freezing point at a cooling rate exceeding −0.5° C./h but no more than −5.0° C./h.

BEST MODE FOR CARRYING OUT THE INVENTION

As follows is a more detailed description of the present invention. First is a description of a method of preserving food in a supercooled state, which represents a first embodiment of the present invention.

In this embodiment, first the food is packed inside a container and the container is sealed. At this time, the inside of the container has no head space (gas phase).

There are no particular restrictions on the food, and applicable foods include liquids, pastes, and solid foods. Specific examples include drinking water, untreated water, milk, other drinks, cream, condensed milk, yogurt, cheese, other dairy products, fruit, vegetables, meats, fish, and processed foods.

In those cases in which the food is in liquid or paste form, then by filling the container with the food and then performing transversal sealing beneath the product fill level, any head space can be easily eliminated. In contrast, if the food is a solid, head space can be eliminated by placing the food inside the container, using a liquid that has no deleterious effect on the quality of the food, such as water, a solution or milk to fill the container, and then performing transversal sealing beneath the product fill level.

Containers formed using a flexible material such as plastic film or a composite material comprising a plastic film are preferred over hard materials such as stainless steel or glass, as they enable the formation of a more stable supercooled state. For example, in the examples described below, mozzarella cheese is placed inside a plastic container, but if the same mozzarella cheese described in the examples is placed in a stainless steel can (with no head space), then the probability of freezing occurring when the can is cooled in a similar manner to the examples is higher than that observed in any of the examples of the present invention.

A preferred container is formed at least partially from a plastic material, and examples include containers formed from a plastic material selected from a group consisting of nylon, polyethylene, polystyrene, polypropylene and polyethylene terephthalate; containers formed from a composite material produced by combining two or more plastic materials selected from the above group by lamination or the like; and containers formed from a composite material produced by combing one or more plastic materials selected from the above group with another material such as paper. In the case of a combination of a plastic material and another material, the inside surface of the container (that is, the surface that contacts the food) is preferably formed from the plastic material.

There are no particular restrictions on the shape of the container, and suitable shapes include bags, spherical shapes, tubes and standing pouches, although shapes close to a spherical shape are preferred.

Next, the food-filled container is cooled, and the temperature of the food is lowered to the supercooling region where the food reaches a supercooled state. The cooling conditions during the lowering of the food temperature are set so that at least while the temperature passes the freezing point, the cooling rate is within a range exceeding −0.5° C./h but no more than −5.0° C./h, that is, a cooling rate that is faster than −0.5° C./h, but is either equal to, or slower than, −5.0° C./h.

If the cooling rate while the temperature passes the freezing point is slower than the above range, then the effect of the present invention in suppressing bacteria reproduction is not totally satisfactory, and the processing efficiency also deteriorates. In contrast if the cooling rate is faster than the above range, a supercooled state may not be achievable.

In those cases in which the container is filled with a solid food and a liquid is used to eliminate head space, cooling is conducted to a temperature at which both the food and the liquid have reached a supercooled state. Furthermore, the cooling conditions in this case, during the lowering of the temperature of both the food and the liquid, are set so that both the cooling rate while the temperature passes the freezing point of the food, and the cooling rate while the temperature passes the freezing point of the liquid, are within a range exceeding −0.5° C./h but no more than −5.0° C./h.

Cooling may either be conducted as a single stage process, wherein a constant cooling rate exceeding −0.5° C./h but no more than −5.0° C./h is used from the commencement of cooling until the desired supercooling region is reached, or conducted as a two stage process, wherein a first cooling stage is conducted at a cooling rate exceeding −5.0° C./h from the commencement of cooling until a point nearing the freezing point, and a subsequent second cooling stage is conducted with a reduced cooling rate within a range exceeding −0.5° C./h but no more than −5.0° C./h until the supercooling region below the freezing point is reached.

Cooling is preferably conducted with the food-filled container in a stationary state. For example, the cooling is preferably conducted by storing the food-filled container in a stationary state inside a refrigerator that has been set to a desired temperature, and the cooling rate can then be controlled by altering factors such as the set temperature inside the refrigerator, the cold air flow rate inside the refrigerator, the way in which the cold air flow contacts the container, and the effective capacity inside the refrigerator.

By maintaining a food that is in a supercooled state, together with its container, at a temperature within the supercooling region, the food can be preserved in the supercooled state.

The freezing point and the supercooling region temperature zone for a food are determined substantially by the food itself, and as a rule, the supercooling region temperature zone is the temperature range from the freezing point to a temperature −20° C. below the freezing point. Some examples of freezing points, and particularly preferred ranges for supercooling regions are shown below in Table 1.

TABLE 1

| Food | Freezing point (° C.) | Preferred supercooling region (° C.) |
|---|---|---|
| Water | 0.0 | 0.0 to −5.0 |
| Milk | −0.5 | −0.5 to −8.0 |
| Fresh cream | −0.5 | −0.5 to −8.0 |
| Mozzarella cheese | −0.3 | −0.3 to −5.0 |
| Non-fat milk powder solution | −0.07 | −0.5 to −8.0 |
| Strawberries | −0.9 | −0.9 to −6.0 |

According to the present embodiment, during the step for reducing the product temperature of the food, the freezing point of the food can be passed at a cooling rate exceeding −0.5° C./h but no more than −5.0° C./h, which is faster than conventional methods, and consequently the food can be converted to a supercooled state more quickly than has conventionally been possible. Accordingly, the length of time required for the cooling step can be shortened, enabling an improvement in processing throughput.

Furthermore from the viewpoint of equipment, conventional cooling equipment can be used, and no new equipment is required. Furthermore, neither the addition of additives to the food nor the application of pressure is required to achieve the supercooled state, and consequently there is no danger of impairing the flavor of the food, making the invention applicable to foods for which the flavors can readily change, such as milk beverages and other dairy products.

In addition, produced food can be converted to a supercooled state in a shorter time, which enables effective suppression of the reproduction of bacteria during the initial stages following production. Accordingly, the invention is particularly suited to the preservation of milk beverages and dairy products, for which bacteria reproduction occurs comparatively readily, and enables an improvement in the preservability of such products.

Furthermore, food that has been packed inside a container with no head space and then converted to a supercooled state by cooling at a comparatively fast cooling rate is not easily disturbed from this supercooled state, meaning a stable supercooled state can be maintained. Accordingly, the food is unlikely to shift to a frozen state even if subjected to vibration, meaning transportation is possible within the temperature zone of the supercooling region, and a favorable supercooled state can be retained even following transportation.

Next is description of a method of preserving food in a frozen state, which represents a second embodiment of the present invention.

In this embodiment, in a similar manner to the first embodiment, first the food is packed inside a container with no head space, and the temperature of the food is then lowered to the supercooling region using cooling conditions in which the cooling rate is within a range exceeding −0.5° C./h but no more than −5.0° C./h, at least while the temperature passes the freezing point.

Subsequently, by forcibly applying a stimulus to the thus supercooled food, the supercooled state is disturbed and the food is converted to a frozen state. The preferred method of disturbing the supercooled state is to cool the supercooled food inside the container at a cooling rate of at least −15° C./h. If the cooling rate is less than −15° C./h, then there is a danger of damage to the cellular structure or protein denaturation occurring during the freezing process.

A food that has been converted to a frozen state in this manner can be preserved in a frozen state by maintaining the container at a low temperature below the freezing point.

According to the present embodiment, by first using a similar method to the first embodiment to form a supercooled state at a temperature below the freezing point, in which the water content is unfrozen, and then performing rapid freezing, a frozen state can be achieved with minimal freezing damage. It is thought that the reason for this observation is that by performing rapid freezing from a supercooled state in which the intracellular fluid and extracellular fluid are not frozen, migration of free water from the intracellular fluid to the extracellular fluid occurs during the freezing process, causing the extracellular fluid to become diluted and more easily frozen, and the intracellular fluid to become more concentrated and less easily frozen, and as a result producing a state in which only the intracellular water remains unfrozen, and the remaining sections are frozen. Furthermore, in the case of foods that incorporate protein, the rapid freezing causes a reduction in the size of generated ice crystals, meaning the three dimensional structure of the protein is less likely to be destroyed by the ice crystals, and thus suppressing protein denaturation.

In addition, because the food can be cooled to the supercooling region in a comparatively short time, bacteria reproduction during the initial stages following production can be effectively suppressed, enabling an improvement in the preservability of the food.

In a similar manner to the first embodiment, the method of this embodiment can be applied to a variety of foods, and enables preservation by freezing to be conducted without freezing damage and with good retention of high quality levels. This method is particularly effective in preventing quality deterioration during the preservation by freezing or thawing of fruit, vegetables and dairy products with a comparatively high water content, which have conventionally been very prone to damage by freezing.

For example in conventional freezing technology the focus of technical developments has been on achieving rapid freezing, and passing the so-called critical temperature zone where damaging ice crystals are formed in heavy concentrations as rapidly as possible, thereby keeping the size of the ice crystals as small as possible, but there are limits to the effectiveness of this method. For example, in the case of delicate fruit such as strawberries, or dairy products with a high water content such as mozzarella cheese or cream cheese, even if freezing is conducted extremely rapidly, damage to the cellular structure or whey formation caused by the freezing and a consequent loss in commercial value have been unavoidable.

In contrast, the method of the present embodiment enables damage to cellular structures during the freezing process or thawing process to be prevented, even for foods that are particularly susceptible to damage by freezing such as fruit, vegetables and dairy products, enabling the structural state prior to freezing to be retained.

Next is description of a method of producing unfrozen water, which represents a third embodiment of the present invention.

In this embodiment, in a similar manner to the first embodiment, water is first placed inside a container and the container is then sealed. At this time, the inside of the container has no head space (gas phase).

There are no particular restrictions on the composition of the water. Normal tap water is suitable, as is water that has undergone sterilization treatment or other treatment for the removal of impurities. The container can utilize the same types of containers as those described for the first embodiment.

Subsequently, the water-filled container is cooled, and in a similar manner to the first embodiment, the temperature of the water is then lowered to the supercooling region, using cooling conditions in which the cooling rate is within a range exceeding −0.5° C./h but no more than −5.0° C./h, at least while the temperature passes the freezing point, thus generating unfrozen water at a temperature below the freezing point.

According to the present embodiment, even water containing impurities such as tap water can be converted to a supercooled state by a simple cooling process, and consequently unfrozen water can be produced cheaply, and at good levels of productivity.

EXAMPLES

As follows is a description of specific examples which clearly illustrate the effects of the present invention.

Examples 1 to 10

Using the conditions shown below in Table 2 and Table 3, foods were placed inside containers and cooled at predetermined cooling rates.

ture of the chamber, and can fluctuate depending on factors such as the cold air flow rate inside the chamber, the way in which the cold air flow contacts the container, and the effective capacity inside the chamber.

In the examples 1 to 7, the number of samples in which freezing had occurred was determined every day, starting from the third day after the commencement of storage in the temperature and humidity chamber. In the examples 8 to 10, the number of samples in which freezing had occurred was determined 15 hours, 24 hours, 39 hours, 48 hours, 63 hours and 87 hours after the commencement of storage in the temperature and humidity chamber. The results are shown in Table 2 and Table 3.

TABLE 2

|  | Chamber internal temp. (° C.) | Cooling rate (° C./h) | Food | Head space | 3 days | 4 days | 5 days | 6 days | 7 days |
|---|---|---|---|---|---|---|---|---|---|
| Example 1 | −3 | −3.4 | Water | Yes | 1 | 2 | 4 | 5 | 6 |
| Example 2 | −3 | −3.4 | Water | No | 0 | 0 | 0 | 0 | 0 |
| Example 3 | −3 | −3.4 | M cheese | No | 0 | 0 | 0 | 0 | 0 |
| Example 4 | −4 | −1.9 | Water | Yes | 9 | 13 | 19 | 23 | 23 |
| Example 5 | −4 | −1.9 | Water | No | 0 | 0 | 0 | 0 | 0 |
| Example 6 | −4 | −1.9 | M cheese | No | 0 | 0 | 0 | 0 | 0 |
| Example 7 | −5 | −5.0 | M cheese | No | 0 | 0 | 0 | 0 | 0 |

TABLE 3

|  | Chamber internal temp. (° C.) | Cooling rate (° C./h) | Food | Head space | 15 hr | 24 hr | 39 hr | 48 hr | 63 hr | 87 hr |
|---|---|---|---|---|---|---|---|---|---|---|
| Example 8 | −6 | −3.5 | Water | Yes | 9 | 16 | 21 | 24 | 25 | 25 |
| Example 9 | −6 | −3.5 | Water | No | 3 | 4 | 6 | 7 | 10 | 12 |
| Example 10 | −6 | −3.5 | M cheese | No | 0 | 0 | 0 | 3 | 3 | 3 |

Namely, containers of size 13.0 cm×14.5 cm (manufactured by DaiNippon Printing Co., Ltd.) formed from a nylon/polyethylene laminate were used as the containers.

These containers were filled with either (1) 210 g of tap water, or (2) 100 g of mozzarella cheese and 110 g of filling water (listed in the tables as M cheese).

The containers were then either (1) subjected to transversal sealing beneath the product fill level so as to ensure no head space (head space: no), or (2) heat sealed with no head space, and a syringe then used to inject air into the container (head space: yes).

In this manner, 25 samples of each of the different types of food-filled containers were prepared, and these samples were then placed in a thermostatic chamber at 20° C. and left to stand until the product temperature inside the containers reached 20° C. The samples were then stored in a stationary manner inside a temperature and humidity chamber (LH40-03M (brand name), manufactured by Nagano Science Co., Ltd.) set to a predetermined internal temperature.

During the process for reducing the product temperature of the food inside a container, the cooling rate as the temperature passed through the region near 0° C. was set to (1) −3.4° C./h, (2) −1.9° C./h, (3) −5.0° C./h, or (4) −3.5° C./h. The cooling rate does not necessarily correlate with the internal tempera- From the results in Table 2 it is evident that in the examples 2, 3, 5, 6 and 7, with no head space, none of the 25 samples had frozen even 7 days after the commencement of storage, indicating good retention of the supercooled state. In contrast, in the examples 1 and 4 which had a head space, freezing was beginning to occur by the third day after the commencement of storage.

From the results in Table 3 it is evident that in the example 9, in which the food inside the container was tap water, the internal temperature within the chamber of −6° C. was lower than the supercooling region of water under these test conditions, and consequently even with no head space and a cooling rate of −3.5° C./h, freezing was beginning to occur within 15 hours of the commencement of storage. Even then, the occurrence of freezing was still less than the example 8 which had a head space.

In contrast in the example 10, which was identical with the example 9 with the exception of having changed the food to mozzarella cheese, the supercooled state was maintained until 39 hours after the commencement of storage, and freezing was only observed after 48 hours. It is thought that the reason for this observation is that the presence of the cheese component in the water causes a lowering in the freezing point.

Examples 11 to 13

With the exceptions of altering the foods as described below, and reducing the number of samples produced to one sample for each example, food-filled containers were prepared in the same manner as the example 10, and the number of samples in which freezing had occurred was determined 15 hours, 24 hours, 39 hours, 48 hours, 63 hours and 87 hours after the commencement of storage in the temperature and humidity chamber. The results are shown in Table 4.

Example 11: Commercially available milk (3.5 MILK (brand name, manufactured by Morinaga Milk Industry Co., Ltd.) 210 g Example 12: Fresh cream (FRESH HEAVY (brand name), manufactured by Morinaga Milk Industry Co., Ltd.) 210 g Example 13: 8.77% by weight aqueous solution of non-fat milk powder 210 g

TABLE 4

|  | Chamber internal temp. (° C.) | Cooling rate (° C./h) | Head space | 15 hr | 24 hr | 39 hr | 48 hr | 63 hr | 87 hr |
|---|---|---|---|---|---|---|---|---|---|
| Example 11 | −6 | −3.5 | No | 0 | 0 | 0 | 0 | 0 | 0 |
| Example 12 | −6 | −3.5 | No | 0 | 0 | 0 | 0 | 0 | 0 |
| Example 13 | −6 | −3.5 | No | 0 | 0 | 0 | 0 | 0 | 0 |

From the results in Table 4 it is clear that a favorable, stable supercooled state was achieved for each of the foods.

Examples 14 to 16

First, the mozzarella cheese to be used as the food for packing into the containers was produced. In other words, fresh milk was pasteurized and subsequently cooled to 32 to 36° C., lactic acid bacteria was added, rennet was added to coagulate the milk, and the resulting curd (coagulated milk) was cut, a certain volume of the generated whey (milk serum) was removed, and the curd was then fermented in the remaining whey. When the pH reached 4.9 to 5.2, the curd was cut and kneaded in hot water at 72 to 82° C., and once an elastic state had been reached, the cheese was formed into spheres of 100 g and cooled. The thus obtained mozzarella cheese was placed in a mozzarella standing pouch together with 110 g of sterilized water, and the pouch was sealed with no head space.

Samples of this freshly produced mozzarella cheese in the pouch (product temperature 20° C.) were cooled to a product temperature of −3.0° C. at the cooling rates shown below in Table 5. The times required to cool the samples to a product temperature of −3.0° C. are also shown in Table 5. As a result of the cooling, each cheese sample was converted to a supercooled state.

Subsequently, once the product temperature had reached −3.0° C., each cheese sample was stored at −3° C. for a period of 4 days. The temperature was then raised to +10° C. at a rate of temperature increase of 2 to 5° C./h, stored for 5 weeks at +10° C., and then taste tested by five panelists, who evaluated the cheese flavor. The external appearance of the cheese after 5 weeks storage was also noted. These results are shown below in Table 5.

Reference Example

As a reference, a sample of mozzarella cheese in a pouch, produced in the same manner as the example 14 above, was stored at +10° C. for 5 weeks immediately following production.

The flavor and external appearance of the cheese after 5 weeks storage were evaluated in the same manner as the example 14. The results are shown below in Table 5.

TABLE 5

|  | Cooling rate (° C./h) | Cooling time (hours) | External appearance | Evaluation of flavor |
|---|---|---|---|---|
| Example 14 | −0.1 | 230 | Multitude of gas holes formed in the cheese | Poor, strong rotten smell |
| Example 15 | −0.5 | 46 | A few gas holes formed in the cheese | Fair, stronger fermented smell than normal |
| Example 16 | −5.0 | 4.6 | Good | Good |
| Reference Example |  |  | Cheese contained even more gas holes than the example 14 | Poor, rotten smell even stronger than the example 14 |

From the results in Table 5 it is evident that in the example 16, in which the cooling rate was set to −5.0° C./h, the external appearance and the flavor were good even after subsequent storage for 5 weeks at +10° C., whereas in the examples 14 and 15, in which the cooling rate was set to −0.5° C./h or lower, gas holes were visible in the exterior of the mozzarella cheese, and the flavor had also deteriorated. It is thought that the reason for this observation is that because the cooling rate was much faster in the example 16, the time taken for the freshly produced product to reach a supercooled state was much shorter, meaning the reproduction of bacteria (such as hetero lactic acid bacteria or other contamination) during the initial stages could be suppressed, thus enabling the reproduction of bacteria following the temperature increase to also be effectively suppressed.

Furthermore in the reference example, an unsatisfactory level of external appearance and flavor had already been confirmed at a point 4 weeks after the production, meaning storage at +10° C. is limited to less than 4 weeks.

In contrast, in the example 16, storage for 5 weeks is possible after the temperature increase to +10° C., indicating that the example 16, in which the cheese was converted to a supercooled state at a comparatively rapid cooling rate, displays superior preservability to the reference example which does not pass through a supercooled state.

Examples 17 to 20

Preservation of foods was conducted under the conditions shown below in Table 6. Namely, 100 cc samples of commercially available milk (manufactured by Morinaga Milk Industry Co., Ltd.) were used to fill containers (pouches, manufactured by DaiNippon Printing Co., Ltd.) formed from a composite material produced by laminating polyethylene terephthalate and polyethylene.

25 samples were prepared of both (1) sealed samples in which the transversal heat sealing was performed beneath the product fill level to ensure no head space, and (2) sealed samples in which heat sealing was performed so as to leave a head space.

These samples were cooled in a refrigerator from +5° C. to the supercooling region of milk at −7° C., in such a manner that the cooling rate as the temperature passed through the region near the freezing point of milk at −0.5° C. was set to either (1) −5.0° C./h, or (2) −10.0° C./h. When the product temperature reached −7° C., and then again after the samples had been stored in the refrigerator at −7° C. for 7 days, the total number of the 25 samples in which the milk had frozen was determined. The results are shown in Table 6.

TABLE 6

|  | Cooling rate (° C./h) | Head space | Point where −7° C. was reached | After 7 days |
|---|---|---|---|---|
| Example 17 | −5 | No | 0 | 0 |
| Example 18 | −5 | Yes | 20 | 25 |
| Example 19 | −10 | No | 25 | 25 |
| Example 20 | −10 | Yes | 25 | 25 |

Example 21

50 cases of commercially available mozzarella cheese (manufactured by Morinaga Milk Industry Co., Ltd.) were prepared. The samples comprised 100 g of the mozzarella cheese packed in a mozzarella standing pouch together with 110 g of filling water, and each pouch was sealed with no head space. One case contained 12 pouches.

The mozzarella cheese samples at a product temperature of 15° C. were stored, in their cases, for 2 days inside a refrigerator at −3° C., thus lowering the product temperature to −2.5° C. The cooling rate as the temperature passed through the region near 0° C. was −0.6° C./h. This process converted the mozzarella cheese to a supercooled state.

Subsequently, the cases were transported by truck for 2 days inside a refrigerated container at −3° C. When the destination was reached, the product temperature was −3° C. and not a single sample had frozen.

Furthermore, when the samples were then stored in the refrigerator at −3° C. for 7.5 months, not a single sample froze, the flavor and physical properties of the cheese were essentially maintained at the same levels observed prior to storage, and no problems developed.

Examples 22 and 23

Using the conditions shown below in Table 7, the same method as that described for the examples 3, 6 and 7 was used to pack 25 samples of mozzarella cheese inside containers with no head space, and then the samples were cooled at predetermined cooling temperatures. In these examples 22 and 23, when the product temperature fell below −2° C., the container was subjected to continuous vibration at a frequency of 120 repetitions/minute.

As a result, in the example 22 wherein the samples were stored at a refrigerator temperature of −4° C. while the vibration was continued, all of the samples remained unfrozen, whereas in the example 23 wherein the samples were stored at a refrigerator temperature of −5° C. while the vibration was continued, some of the samples froze.

Typically, if the same mozzarella cheese as that used in the example 22 is packed with a head space, and the same vibration as the example 22 is applied, then cooling and storage at −4° C. is impossible. Hence it is evident that samples of the present invention are more resistant to vibrations and other stimuli than samples produced using conventional techniques.

Furthermore in the case of mozzarella cheese, although the preferred supercooling region is between −0.3° C. and −5.0° C., as shown in Table 1, it became clear that cooling temperatures and/or storage temperatures of −4.0° C. or higher are less prone to the effects of vibration, and are consequently preferred.

TABLE 7

|  | Refrigerator internal temp. (° C.) | Cooling rate (° C./h) | Food | Head space | Vibration | 1 day | 2 days | 6 days | 11 days | 13 days |
|---|---|---|---|---|---|---|---|---|---|---|
| Example 22 | −4 | −1.4 | M cheese | No | Yes | 0 | 0 | 0 | 0 | 0 |
| Example 23 | −5 | −1.9 | M cheese | No | Yes | 0 | 1 | 2 | 2 | 2 |

INDUSTRIAL APPLICABILITY

According to a method of preserving food according to the present invention, by packing food inside a container with no head space, and then converting the food to a supercooled state by a cooling step in which the food is cooled from a temperature higher than the freezing point to a temperature below the freezing point at a cooling rate exceeding −0.5° C./h but no more than −5.0° C./h, a supercooled state with excellent stability can be achieved in a short time period, and the preservability of the food can be improved.

In another method of preserving food according to the present invention, by packing food inside a container with no head space, subsequently converting the food to a supercooled state by a cooling step in which the food is cooled from a temperature higher than the freezing point to a temperature below the freezing point at a cooling rate exceeding −0.5° C./h but no more than −5.0° C./h, and then disturbing the supercooled state to form a frozen state, damage by freezing can be prevented, and the food can be preserved in a frozen state with good retention of food quality.

Furthermore, in a method of producing unfrozen water according to the present invention, by filling the inside of a container with water, leaving no head space, and then converting the water to a supercooled state by a cooling step in which the water is cooled from a temperature higher than the freezing point to a temperature below the freezing point at a cooling rate exceeding −0.5° C./h but no more than −5.0° C./h, unfrozen water can be produced cheaply, and at good levels of productivity.

The invention claimed is:

1. A method of preserving food in a supercooled state comprising:

filling food in a container to a level to form a fill level in the container, and transversely sealing the food-containing container beneath the food fill level so that the food is sealed in the container with no head space; and then converting the food, sealed in the container, to a supercooled state by cooling said food in said sealed container, containing no head space, from a temperature higher than the freezing point of the food to a temperature below the freezing point of the food at a cooling rate exceeding 0.5° C./h, but no more than 5.0° C./h, said supercooling state being achieved without the application of pressure.

2. A method of preserving food according to claim 1, wherein at least a portion of said container is formed from a plastic material.

3. A method of preserving food in a frozen state comprising:

filling food in a container to a level to form a fill level in the container, and transversely sealing the food-containing container beneath the food fill level so that the food is sealed in the container with no head space converting the food, sealed in the container, to a supercooled state by cooling said food in the sealed container, containing no head space, from a temperature higher than the freezing point of the food to a temperature below the freezing point of the food at a cooling rate exceeding 0.5° C./h, but no more than 5.0° C./h; said supercooled state being achieved without the application of pressure; and then converting the supercooled food in said supercooled state to a frozen state by disturbing said supercooled state of the food in the sealed container, said supercooled state being achieved without the application of pressure.

4. A method of preserving food according to claim 3, wherein said supercooled state is disturbed by further cooling said food in said supercooled state in the sealed container at a cooling rate of at least 15° C./h.

* * * * *